A. B. DRYGAS.
GRAIN HEADER.
APPLICATION FILED JAN. 15, 1915.

1,154,493.

Patented Sept. 21, 1915.
5 SHEETS—SHEET 3.

Fig. 3.

WITNESSES:

INVENTOR.
A. B. Drygas
BY Victor J. Evans
ATTORNEYS.

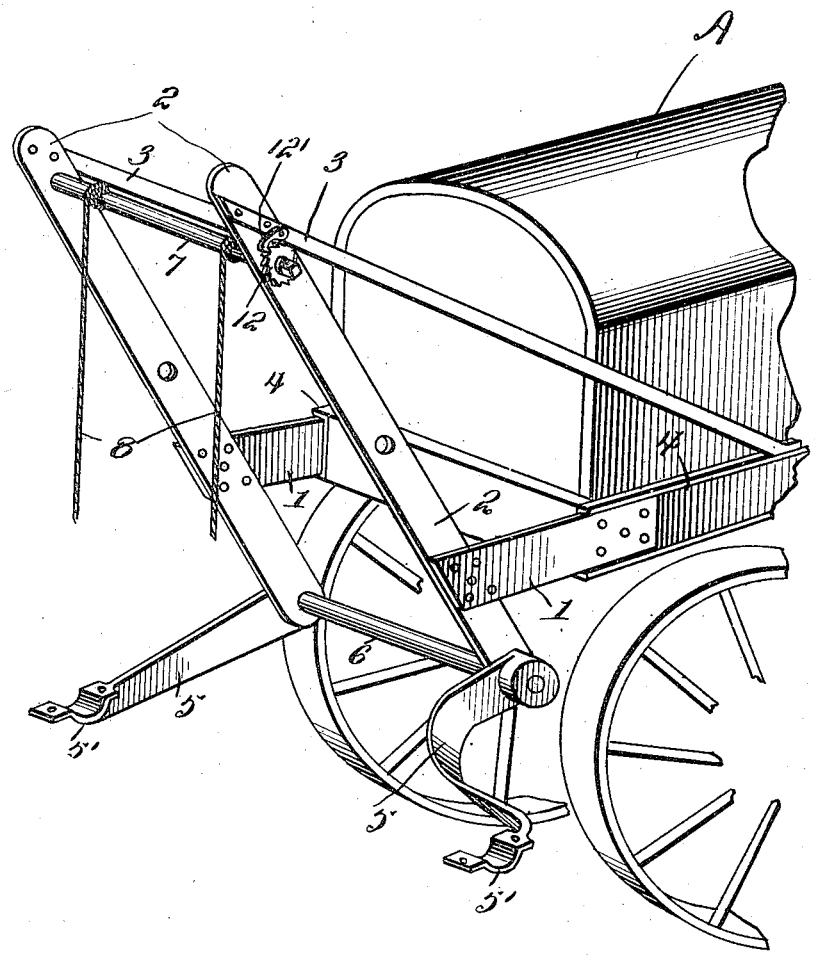

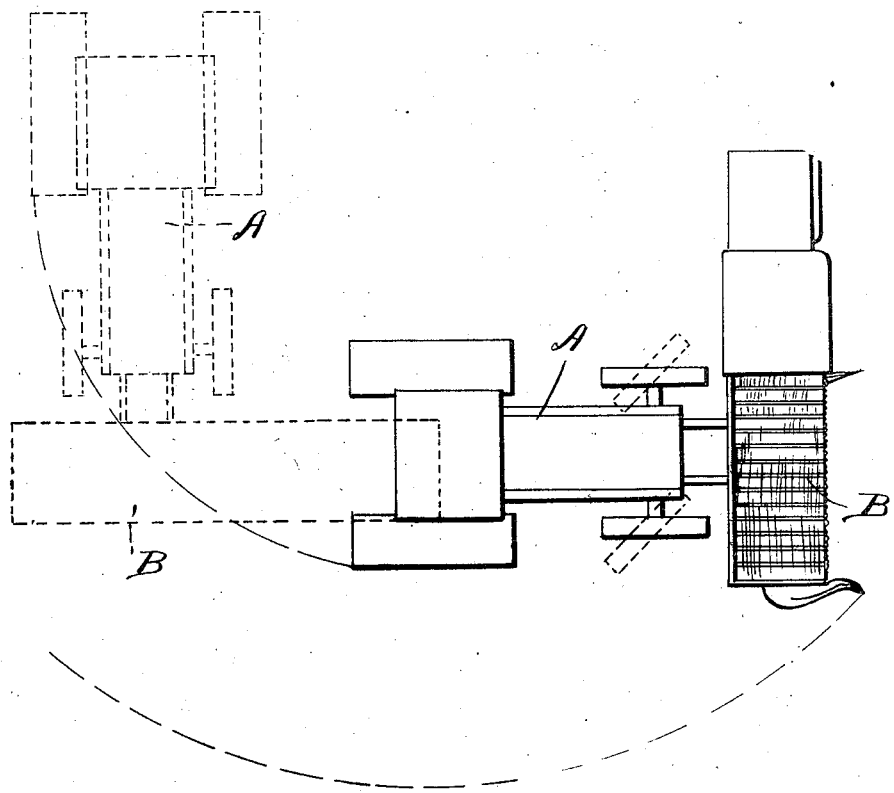

UNITED STATES PATENT OFFICE.

ALBERT B. DRYGAS, OF ST. CLOUD, MINNESOTA.

GRAIN-HEADER.

1,154,493.  Specification of Letters Patent.  Patented Sept. 21, 1915.

Application filed January 15, 1915.  Serial No. 2,454.

*To all whom it may concern:*

Be it known that I, ALBERT B. DRYGAS, a citizen of the United States, residing at St. Cloud, in the county of Stearns and State of Minnesota, have invented new and useful Improvements in Grain-Headers, of which the following is a specification.

This invention relates to improvements in grain headers, header binders, and other like machines, the object of the invention being to provide an improved mechanism of this kind which is especially adapted to be attached to and used in connection with and driven by a farm tractor, and which can be readily moved from place to place over country roads when not in operation.

Another object is to provide an improved form of carrying or supporting frame for the heading and binding mechanism and which adapts the same to be readily attached to a tractor.

Another object is to provide driving mechanism for the cutter mechanism and conveyer of the grain header and which is actuated by the motor of the tractor.

With the above and other objects in view the invention consists in the construction, combination and arrangement of devices hereinafter described and claimed.

Figure 1:
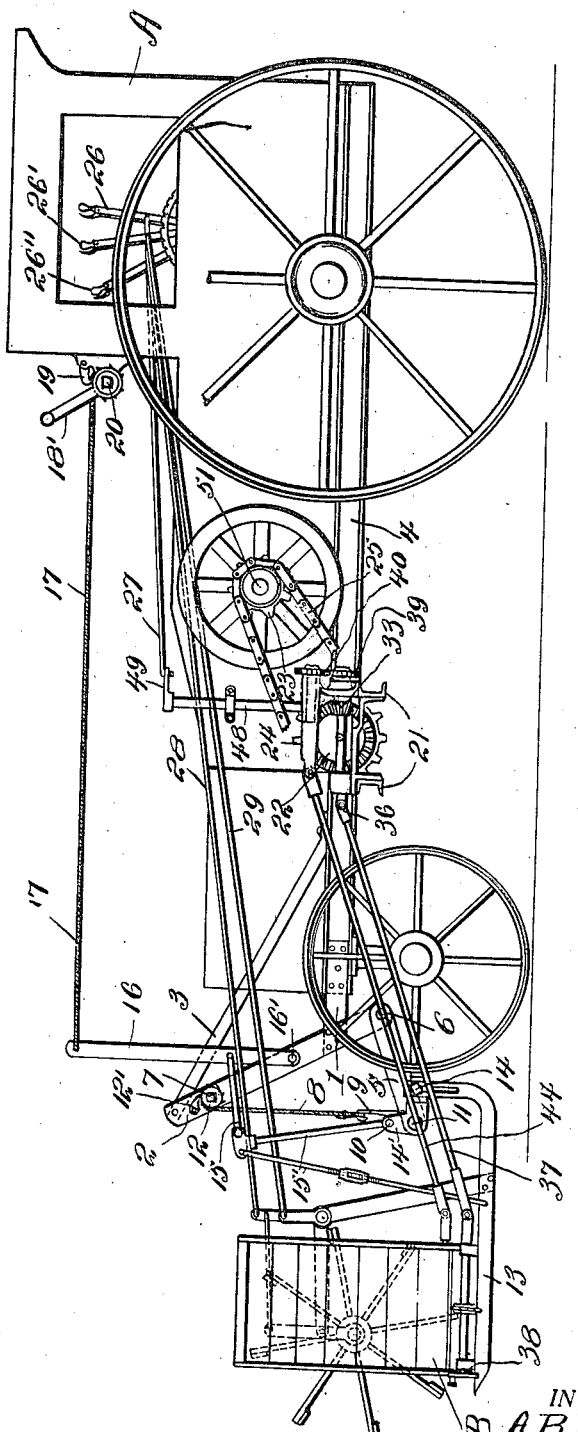
Figure 2:
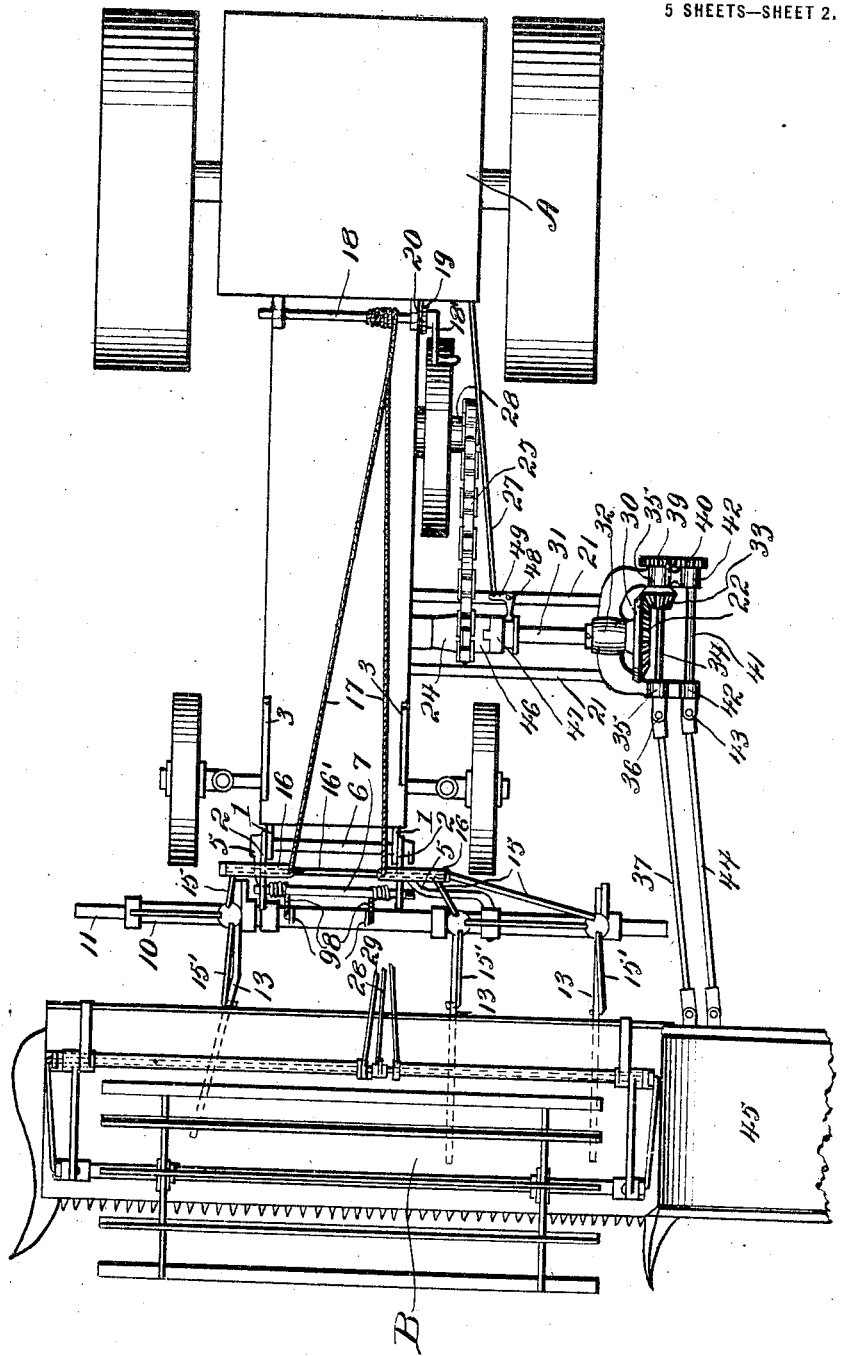

In the accompanying drawings: Figure 1 is a side elevation of a grain header constructed in accordance with my invention, showing the same attached to the front end of a farm tractor for operation thereby. Fig. 2 is a plan of the same. Fig. 3 is a front elevation of the same. Fig. 4 is a detail perspective view of the carrier frame, showing the same attached to the front end of a tractor. Fig. 5 is a diagrammatic plan of the tractor and grain header, showing the same in one position in full lines and in another position in dotted lines and illustrating the manner in which the machine is turned in the grain field.

A farm tractor is indicated at A and my improved header binder mechanism is indicated at B. Channel irons which form the sides of the tractor frame are indicated at 4. In accordance with my invention I provide a pair of carrier arms 1, which in practice are preferably channel irons. The rear ends of the carrier arms are bolted in the front end of the irons 4 so that said carrier arms project forwardly from the front end of the tractor. A pair of forwardly and upwardly inclined bars 2 which are also in practice channel irons are bolted to the inner sides of the arms 1 at the front end of the latter and at points spaced from the lower end of the bars 2 so that the major, upper portion of said bars 2 extend above the arms 1. Braces 3 are provided for the bars 2, the front ends of said braces being bolted near the upper end of said bars and the rear ends of said braces being bolted on the channel irons 4. A rock shaft 6 is mounted in bearings near the lower end of the bars 2 and is provided at its end with bracket arms 5. A shaft 7, which forms a winch is mounted in bearings near the upper ends of the bars 2 and has one end squared to receive a suitable crank, by means of which said winch may be turned. A ratchet wheel 12 is secured on the winch shaft and a pawl 12' is provided to engage said ratchet wheel and hold the winch against rotation.

The header binder mechanism is of the usual, well known construction, having its frame provided with the usual shafts 10—11. The usual wheels are removed from said shafts and said shaft 11 is secured by suitable clamps 5' on the front end of the bracket arms 5 so that the entire header binder mechanism is carried and its weight sustained by the carrier frame and is hence imposed on the tractor. The shaft 10 is provided with hooks 9. Cables 8 have their lower ends attached to said hooks and their upper ends attached to the winch 7 and hence by turning said winch the bracket arms 5 may be raised and lowered to raise or lower the header binder as may be desired.

The usual bracket arms 13 of the frame of the header binder are pivotally and adjustably secured by bolts 14 to the usual knuckles 14'. A pair of levers 16 have their lower ends attached to a shaft 16' which is mounted in bearing openings in the bars 2 and these levers are connected by rods 15 to the usual devices 15' which brace and enable the header binder to be raised and lowered. A winch 18 is mounted in suitable bearings on the tractor, preferably at the front side of the cab and is provided with a suitable crank 18' whereby it may be turned and also with a ratchet wheel 20 which is engaged by a pawl 19. Cables 17 are attached to the levers 16 and to the winch 18 and hence by turning the latter the levers 16 may be operated to raise or lower the front end of the header binder as may be required, independently of the winch 7 and its connections.

Controlling levers 26'—26'' are shown mounted in the cab of the tractor and connected respectively by rods 28—29 to the controlling devices of the header binder. In carrying out my invention I also provide the tractor frame, on one side, with a pair of brackets 21 on which the usual driving mechanism or gearing of the header binder is mounted. Such gearing is here shown as comprising a beveled gear 30 on a shaft 31 which is mounted in a bearing 32 and a smaller beveled gear 33 on a shaft 34 which is mounted in bearings 35 and is at right angles to the driving shaft 31. Said shaft 34 is connected by a knuckle 36 to the flexible or knuckled shaft 37 which revolves the usual crank wheel 38 that operates the pitman of the cutter bar. Said shaft 34 also has a spur gear 39 which engages a similar gear 40 on a shaft 41 which is mounted in bearings 42 and is connected by a knuckle 43 to the flexible or knuckled shaft 44 that drives the elevator 45, or conveyer of the header binder. A sprocket wheel 24 is loosely mounted on the shaft 31 and its hub is formed with a clutch element 46. A clutch element 47 is splined on the driving shaft 31 and is movable into and out of engagement with the clutch element 46 by a shipper on a vertical rock shaft 48. Said rock shaft is provided at its upper end with a crank 49 which is connected by a rod 27 to a lever 26 which is also mounted in the cab, of the tractor. The motor shaft 51 is provided with a sprocket wheel 23 which is connected by an endless sprocket chain 25 to the sprocket wheel 24. Hence the driving gear of the header binder is driven directly from the motor of the tractor and hence the header binder may be operated when the tractor is standing still as well as when the tractor is in motion. By disconnecting the clutch element 47 from the clutch element 46, which may be done by the operation of the lever 26 the mechanism of the header binder may be stopped when desired. The header binder may thus be operated and carried by the tractor and may be moved in any required position and readily turned in a corner, by backing up the tractor as indicated in the diagram of Fig. 5. By thus mounting the header binder on the tractor great economy is effected in the work of harvesting, as the header binder can be thus equipped and arranged, may be readily operated by one man, whereas several, usually three, are ordinarily employed in operating the usual header binder in performing the same amount of work. Moreover there is no side draft on my improved header binder and the power required to operate the same is very greatly reduced. Moreover since the power of the tractor motor is applied directly to the driving gearing of the header binder all danger of the elevator becoming blocked or stalled by heavy grain is entirely eliminated.

Having thus described my invention, I claim:—

In combination with a tractor having a frame and also having a motor provided with a driving shaft projecting from one side of the frame, a header binder mechanism having bracket arms, and also having a frame provided with a pair of shafts, one having hooks and knuckles pivotally secured to said bracket arms, a pair of carrier arms secured to the frame of the tractor and extending forwardly therefrom, bars carried by said carrier arms, a pair of brackets pivotally connected to the lower ends of said bars and provided with bars for one of said shafts of the header binder, a winch mounted in bearings in the upper ends of said bars, cables connected to said winch and other hooks of the other shaft, raising and lowering means for the header binder, levers connected to said raising and lowering means and pivotally mounted on said bars, means to operate said levers, controlling devices for the header binder, levers mounted on the tractor and connected to said controlling devices, driving mechanism for the header binder, supporting brackets therefor secured on one side of the tractor frame, power transmitting means between said driving mechanism and said motor shaft, a clutch element of said driving mechanism and a lever mounted on the tractor and connections between said lever and said clutch element to actuate the latter.

In testimony whereof I affix my signature in presence of two witnesses.

ALBERT B. DRYGAS.

Witnesses:
 MARIE THILL,
 GEO. G. MAGNUSON.

Copies of this patent may be obtained for five cents each, by addressing the "Commissioner of Patents Washington, D. C."